US010788340B1

(12) United States Patent
Tin et al.

(10) Patent No.: US 10,788,340 B1
(45) Date of Patent: Sep. 29, 2020

(54) HIGH RESOLUTION AND HIGH EFFICIENCY PHOTONIC AIR DATA DETECTION (71) Applicant: Honeywell International Inc., Morris Plains, NJ (US)

(72) Inventors: Steven Tin, Edina, MN (US); Chad Fertig, Bloomington, MN (US); Matthew Wade Puckett, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/569,555

(22) Filed: Sep. 12, 2019

(51) Int. Cl.
G01D 5/353 (2006.01)
G01B 9/02 (2006.01)
G01S 7/481 (2006.01)
G01N 21/47 (2006.01)
G01S 17/89 (2020.01)

(52) U.S. Cl.
CPC ..... *G01D 5/35358* (2013.01); *G01B 9/02002* (2013.01); *G01B 9/02051* (2013.01); *G01N 21/4795* (2013.01); *G01S 7/4811* (2013.01); *G01S 17/89* (2013.01)

(58) Field of Classification Search
CPC ............ G01D 5/35358; G01B 9/02051; G01B 9/02002; G01S 7/4811; G01S 17/89; G01N 21/4795
See application file for complete search history.

(56) References Cited

U.S. PATENT DOCUMENTS

| 5,333,000 | A  | * | 7/1994 | Hietala | ..................... G02F 2/02 342/368 |
|---|---|---|---|---|---|
| 10,191,145 | B2 | * | 1/2019 | Swanson | ............... G01S 7/4812 |
| 10,534,189 | B2 | * | 1/2020 | Miller | .................. G02B 27/145 |
| 10,545,289 | B1 | * | 1/2020 | Chriqui | ................ G02F 1/2955 |
| 10,591,802 | B2 | * | 3/2020 | Sun | ....................... G02F 1/2955 |

(Continued)

FOREIGN PATENT DOCUMENTS

WO 2013052861 A1 4/2013

OTHER PUBLICATIONS

Martin et al., "Photonic Integrated Circuit-Based FMCW Coherent LiDAR", Journal of Lightwave Technology, Oct. 1, 2018, pp. 4640-4645, vol. 36, No. 19, IEEE.

(Continued)

*Primary Examiner* — Ryan A Lepisto
(74) *Attorney, Agent, or Firm* — Fogg & Powers LLC (57) ABSTRACT A system for light detection and ranging (LiDAR) based sensing including air data detection is disclosed. The system comprises a photonics substrate comprising a passive optical filter array configured to receive backscattered light produced in a region of interest when a light beam is emitted by a laser device, and a reference beam from the laser device. The passive optical filter array includes a plurality of optical notch filters in optical communication with each other, the optical notch filters operative for frequency selection, and a plurality of optical detectors each respectively coupled to an output of one of the optical notch filters. The passive optical filter array is operative to perform frequency spectrum decomposition of the received backscattered light into a plurality of signals for data extraction and processing to determine air data parameters.

20 Claims, 10 Drawing Sheets (56) References Cited

U.S. PATENT DOCUMENTS

| | | | |
|---|---|---|---|
| 2017/0299697 A1 | 10/2017 | Swanson | |
| 2017/0371227 A1* | 12/2017 | Skirlo | G02F 1/2955 |
| 2018/0306925 A1* | 10/2018 | Hosseini | G01S 7/4813 |
| 2018/0356528 A1* | 12/2018 | Schaffner | G01S 17/58 |
| 2019/0204419 A1* | 7/2019 | Baba | G01S 7/4811 |
| 2020/0049799 A1* | 2/2020 | Ando | G01S 7/4813 |
| 2020/0088876 A1* | 3/2020 | Tanemura | G01S 7/4817 |

OTHER PUBLICATIONS

Tin et al. "High Temperature and High Dynamic Bandwidth Photonic Sensor for Gas Flow Rate, Temperature, and Pressure Measurement", U.S. Appl. No. 16/569,581, filed Sep. 12, 2019; pp. 1-34.

* cited by examiner

HIGH RESOLUTION AND HIGH EFFICIENCY PHOTONIC AIR DATA DETECTION

BACKGROUND

While current industry standard Pitot tube based air data systems offer good performances, they are prone to blockage (due to icing, ash, etc.) and mechanical damages (due to hail, birds, etc.). A robust stand-off air data measurement system with different failure modes is highly desirable to be used either as the secondary or primary air data system.

Direct detection Doppler Light Detection and Ranging (LiDAR) air data systems based on backscattered light from air molecules have been demonstrated, but such systems are mostly based on inefficient (greater than 90% light wasted) and computation intensive fringe imaging with a Fabry-Perot etalon.

SUMMARY

A system for light detection and ranging (LiDAR) based sensing including air data detection is described herein. The system comprises a photonics substrate comprising a passive optical filter array configured to receive backscattered light produced in a region of interest when a light beam is emitted by a laser device, and a reference beam from the laser device. The passive optical filter array includes a plurality of optical notch filters in optical communication with each other, the optical notch filters operative for frequency selection, and a plurality of optical detectors each respectively coupled to an output of one of the optical notch filters. The passive optical filter array is operative to perform frequency spectrum decomposition of the received backscattered light into a plurality of signals for data extraction and processing to determine air data parameters.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of photonic air data detection systems, with high resolution and high efficiency, are described herein. The photonic air data detection systems can be implemented as part of Light Detection and Ranging (LiDAR) air data systems, which can be used on a variety of vehicles to measure air data.

In some embodiments, integrated silicon photonics (SiP) LiDAR air data detection systems are provided, which use optical signal processing with passive optical frequency spectrum decomposition for high efficiency, low power consumption, and a miniature volume. The SiP LiDAR signal processing with optical frequency spectrum decomposition provides a low size, weight, and power (SWAP) solution for both existing LiDAR systems and micro-LiDAR systems that can be important for air mobility applications.

The air data detection systems can be used, for example, in LiDAR air data systems for urban air mobility vehicles, unmanned aerial vehicles, drones, aircraft, or the like.

In one embodiment, an air data detection system can be implemented on a photonics chip, such that backscattered light from a region of interest interrogated by a probing laser beam is coupled onto the photonics chip. A small portion of the probing laser beam is also coupled onto the photonics chip to provide a reference for Doppler shift. The photonics chip includes a passive optical filter array with optical detectors that provide frequency spectrum decomposition of the backscattered light. The optical filter array is designed to cover the entire relevant frequency spectrum with optimized bandwidth for data extraction. The optical filter array includes a series of optical notch filters for frequency selection and optical spectrum decomposition.

It should be understood that the air data detection system is independent of the implementation of the laser probing system. As such, the reference laser beam and the backscattered light can be coupled onto the photonics chip through various optical components such as optical fibers, grating couplers, waveguides, or combinations thereof.

To overcome the possibility of the probing laser, and thus the backscattered light, drifting in wavelength overtime, a heater can be coupled to the optical filter array to align the decomposition band with the probing laser wavelength.

The various components of the air data detection systems described herein can be formed using standard micro-fabrication techniques, such as employed in the manufacture of photonics devices. It should be understood that the number of optical notch filters and corresponding optical detectors formed on an optical filter array can be varied, depending on the application desired and the design parameters required.

An air data system according to one embodiment, which incorporates the instant air data detection techniques, includes a laser device operative to emit a light beam into a region of interest, and an air data detection system in operative communication with the laser device. The air data detection system includes a photonics substrate comprising at least one optical coupler configured to receive backscattered light from the region of interest, and a reference light from the laser device. A passive optical filter array is in optical communication with the at least one optical coupler, with the optical filter array configured to receive the backscattered light and the reference light from the at least one optical coupler. A processing unit is operatively coupled to an output of the passive optical filter array.

Further details of various embodiments are described hereafter with reference to the drawings.

Figure 1:
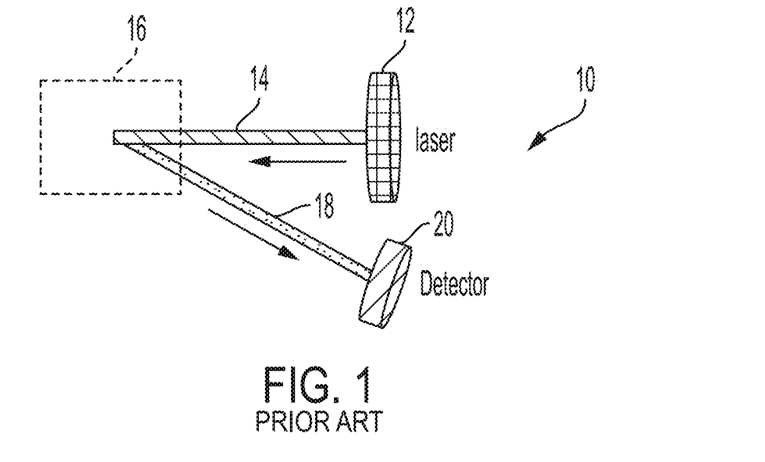
FIG. 1 is a schematic illustration of a conventional Light Detection and Ranging (LiDAR) air data system, according to an exemplary implementation.

FIG. 1 is a schematic illustration of a conventional LiDAR air data system 10, according to an exemplary implementation. The LiDAR air data system 10 generally includes at least one laser device 12 that emits a beam 14 into a region of interest 16. Backscattered light 18 resulting from beam 14 is detected in region of interest 16. The backscattered light 18 for a desired measurement point is detected by an optical detector 20 of LiDAR air data system 10.

Figure 2:
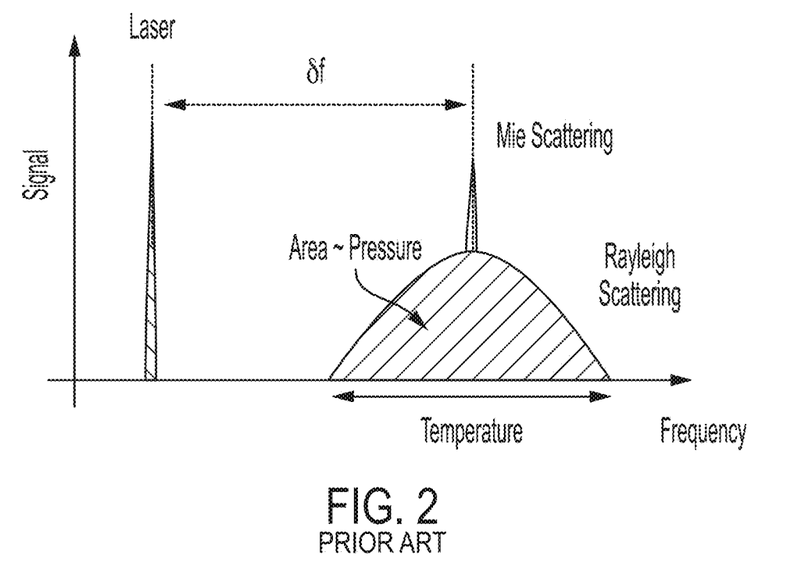
FIG. 2 is a graphical representation of the measurements that can be obtained from the LiDAR air data system of FIG. 1.

FIG. 2 is a graphical representation of the measurements that can be obtained from LiDAR air data system 10, in which environmental information is extracted from backscattered light 18. The backscattered light 18 detected by optical detector 20 includes backscattered light from large particles (Mie Scattering) and small gas molecules (Rayleigh Scattering), which carry information about gas flow speed (Doppler shift, δf), gas temperature, and gas pressure (area under the Rayleigh Scattering curve). At least three of LiDAR air data system 10 can be utilized to extract three-dimensional (3D) air speed information.

Figure 3:
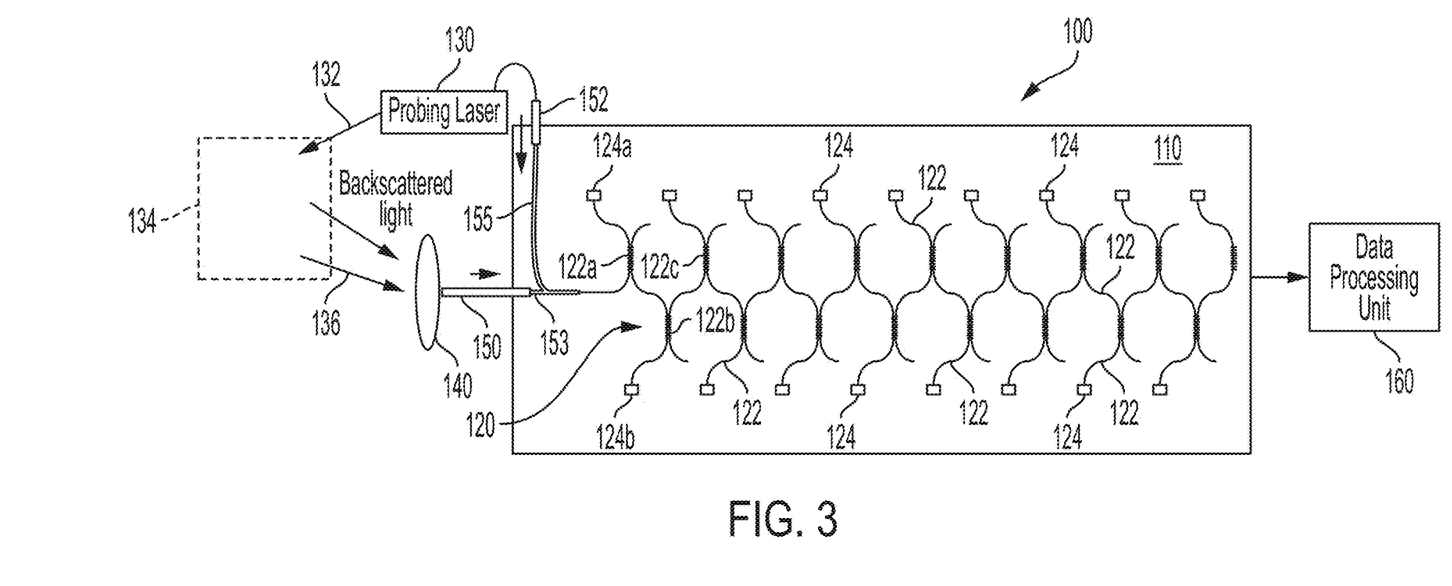
FIG. 3 is a schematic illustration of an air data detection system, according to one embodiment, which can be implemented as part of a LiDAR air data system.

FIG. 3 illustrates an air data detection system 100, according to one embodiment, which can be implemented as part of a LiDAR air data system. The detection system 100 includes a photonics substrate 110, such as a silicon photonics (SiP) chip or the like. The photonics substrate 110 has a passive optical filter array 120, which includes a plurality of optical notch filters 122 that are in optical communication with each other. A plurality of optical detectors 124 are each respectively coupled to an output (drop port) of one of optical notch filters 122. The optical notch filters 122 are operative for frequency selection such that each notch filter passes a selected frequency band to a respective one of optical detectors 124. Further details with respect to the notch filters are described hereafter.

The photonics substrate 110 is optically coupled to a probing laser device 130, which is operative to emit an interrogating beam 132 into a region of interest 134. The photonics substrate 110 is configured to receive backscattered light 136 from region of interest 134. The backscattered light 136 is collected by a lens 140 and focused into a first optical fiber 150, which directs the focused backscattered light to photonics substrate 110. A portion of the beam from laser device 130 is directed as a reference beam by a second optical fiber 152 to photonics substrate 110. The reference beam is coupled onto photonics substrate 110 to provide a reference for Doppler shift.

In one embodiment, a first fiber-to-waveguide coupler on photonics substrate 110 is configured to couple the backscattered light from first optical fiber 150 into a first waveguide 153 on photonics substrate 110, with first waveguide 153 in optical communication with optical filter array 120 such that the coupled backscattered light is directed to an input of optical filter array 120. A second fiber-to-waveguide coupler on photonics substrate 110 is configured to couple the reference beam from second optical fiber 152 into a second waveguide 155 of photonics substrate 110, with second waveguide 155 in optical communication with passive optical filter array 120 such that the coupled reference beam is directed to the input of optical filter array 120.

A data processing unit 160 is operatively coupled to an output of optical filter array 120. The data processing unit 160 can use output signals from optical filter array 120 to determine a variety of air data parameters.

During operation of optical filter array 120, the backscattered light and reference beam are directed to an input port of a first notch filter 122a. A selected first frequency is passed through a drop port of first notch filter 122a to a first detector 124a, and the remaining frequencies are reflected through a reflection port of first notch filter 122a to an input port of a second notch filter 122b. A selected second frequency is passed through a drop port of second notch filter 122b to a second detector 124b, and the remaining frequencies are reflected through a reflection port of second notch filter 122b to an input port of third notch filter 122c. This filtering process continues until all of the notch filters have passed respective selected frequencies to their respective detectors. In this way, optical filter array 120 performs a passive frequency spectrum decomposition of the backscattered light into a plurality of output signals, which can be used for data extraction by data processing unit 160 to determine various air data parameters such as pressure, temperature, air speed, and the like.

Figure 4:
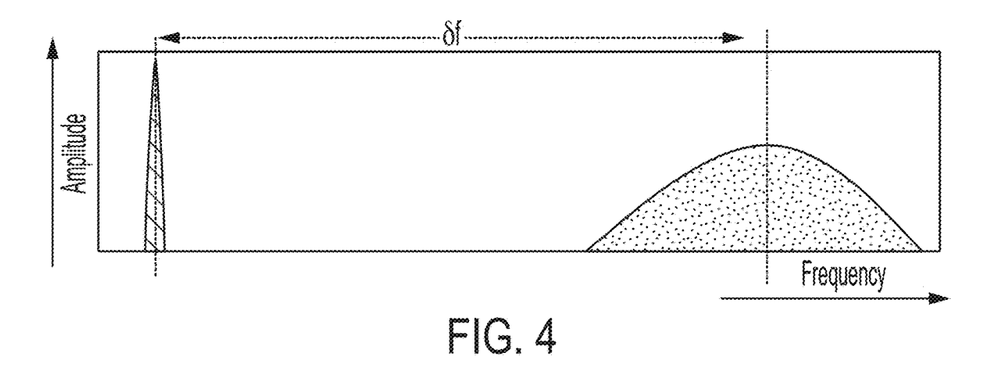
FIG. 4 is a graphical representation of the output signals that can be obtained from the air data detection system of FIG. 3.

FIG. 4 is a graphical representation of the output signals that can be obtained from air data detection system 100 (FIG. 3). The signals from all the detectors at any given time can reconstruct the data representations shown in FIG. 4, corresponding to the air data at that time. The optical filter array 120 is designed to cover the entire relevant frequency spectrum with optimized bandwidth for data extraction.

Figure 5:
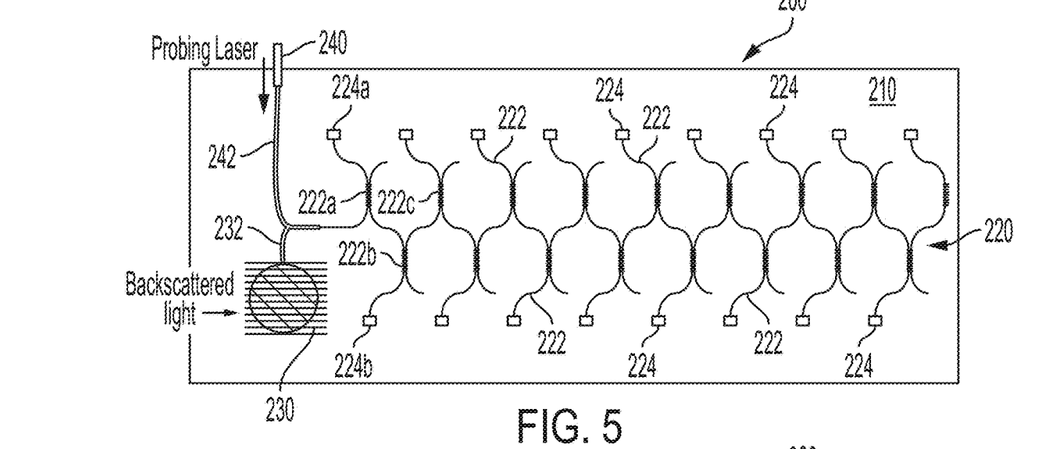
FIG. 5 is a schematic illustration of an air data detection system, according to another embodiment, which can be implemented as part of a LiDAR air data system.

FIG. 5 illustrates an air data detection system 200, according to another embodiment, which can be implemented as part of a LiDAR air data system. The detection system 200 includes a photonics substrate 210, such as a SiP chip or the like. The photonics substrate 210 has a passive optical filter array 220, which includes a plurality of optical notch filters 222 that are in optical communication with each other. A plurality of optical detectors 224 are each respectively coupled to an output of one of optical notch filters 222. The optical notch filters 222 are operative for frequency selection such that each notch filter passes a selected frequency band to a respective one of optical detectors 224.

The photonics substrate 210 is optically coupled to a probing laser, which is operative to emit an interrogating beam into a region of interest. The photonics substrate 210 is configured to receive backscattered light from the region of interest. The backscattered light is coupled onto photonics substrate 210 through a grating coupler 230, such as a SiP grating coupler.

A portion of the beam from the probing laser is directed as a reference beam by an optical fiber 240 onto photonics substrate 210. The reference beam is coupled onto photonics chip 210 to provide a reference for Doppler shift.

In one embodiment, grating coupler 230 is configured to couple the backscattered light into a first waveguide 232 on photonics substrate 210, with first waveguide 232 in optical communication with optical filter array 220 such that the coupled backscattered light is directed to an input of optical filter array 220. A fiber-to-waveguide coupler on photonics substrate 210 is configured to couple the reference beam from optical fiber 240 into a second waveguide 242 on photonics substrate 210, with second waveguide 242 in optical communication with optical filter array 220 such that the coupled reference beam is directed to the input of optical filter array 220.

During operation of optical filter array 220, the backscattered light and reference beam are directed to an input port of a first notch filter 222a of optical filter array 220. A selected first frequency is passed through a drop port of first notch filter 222a to a first detector 224a, and the remaining frequencies are reflected through a reflection port of first notch filter 222a to an input port of a second notch filter 222b. A selected second frequency is passed through a drop port of second notch filter 222b to a second detector 224b, and the remaining frequencies are reflected through a reflection port of second notch filter 222b to an input port of a third notch filter 222c. This filtering process continues until all of the notch filters have passed respective selected frequencies to their respective detectors. In this way, optical filter array 220 performs a passive frequency spectrum decomposition of the backscattered light into a plurality of output signals, which can be used for data extraction by a processing unit to determine air data parameters.

Figure 6:
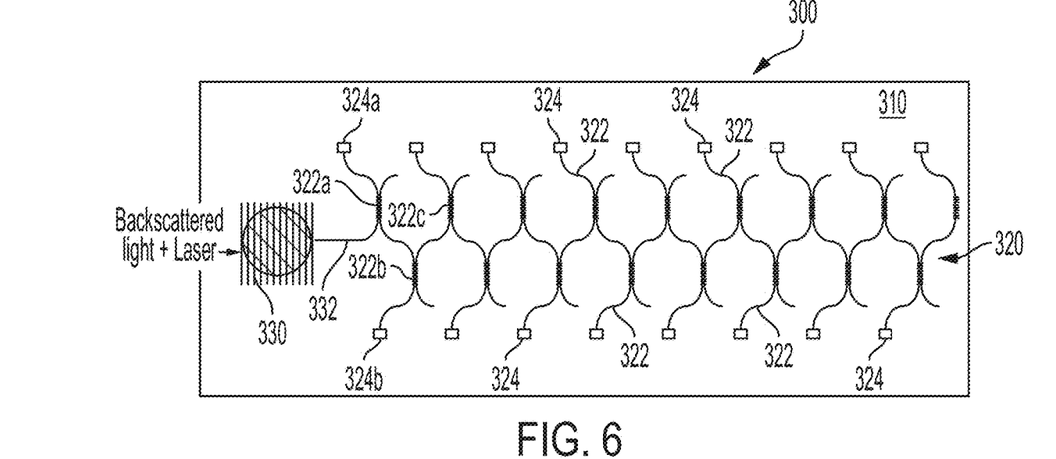
FIG. 6 is a schematic illustration of an air data detection system, according to a further embodiment, which can be implemented as part of a LiDAR air data system.

FIG. 6 illustrates an air data detection system 300, according to a further embodiment, which can be implemented as part of a LiDAR air data system. The detection system 300 includes a photonics substrate 310 such as a silicon photonics chip. The photonics substrate 310 has a passive optical filter array 320, which includes a plurality of optical notch filters 322 that are in optical communication with each other. A plurality of optical detectors 324 are each respectively coupled to an output of one of optical notch filters 322. The optical notch filters 322 are operative for frequency selection such that each notch filter passes a selected frequency band to a respective one of optical detectors 324.

The photonics substrate 310 is configured to receive backscattered light from a region of interest that is interrogated by a beam from a probing laser, and also a portion of the beam from the laser as a reference beam for Doppler shift. The backscattered light and reference beam are coupled onto photonics substrate 310 through a grating coupler 330 such as a SiP grating coupler.

In one embodiment, grating coupler 330 is configured to couple the backscattered light and reference beam into a waveguide 332 on photonics substrate 310, with waveguide 332 in optical communication with optical filter array 320 such that the coupled backscattered light and reference beam are directed to an input of optical filter array 330.

During operation of optical filter array 320, the backscattered light and reference beam are directed to an input port of a first notch filter 322a of optical filter array 320. A selected first frequency is passed through a drop port of first notch filter 322a to a first detector 324a, and the remaining frequencies are reflected through a reflection port of first notch filter 322a to an input port of a second notch filter 322b. A selected second frequency is passed through a drop port of second notch filter 322b to a second detector 324b, and the remaining frequencies are reflected through a reflection port of second notch filter 322b to an input port of a third notch filter 322c. This filtering process continues until all of the notch filters have passed respective selected frequencies to their respective detectors. In this way, optical filter array 320 performs a passive frequency spectrum decomposition of the backscattered light into a plurality of output signals, which can be used for data extraction by a processing unit to determine air data parameters.

Figure 7A:
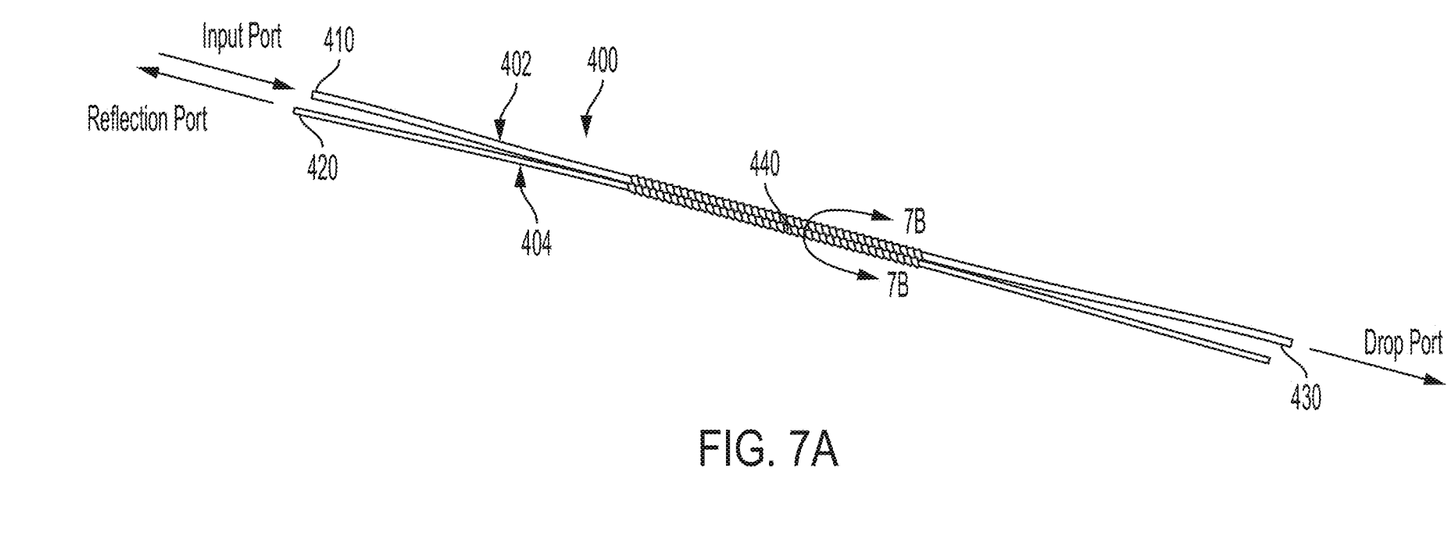
FIG. 7A is a schematic perspective view of an optical notch filter, according to an exemplary embodiment, which can be implemented in an optical filter array of an air data detection system.
Figure 7B:
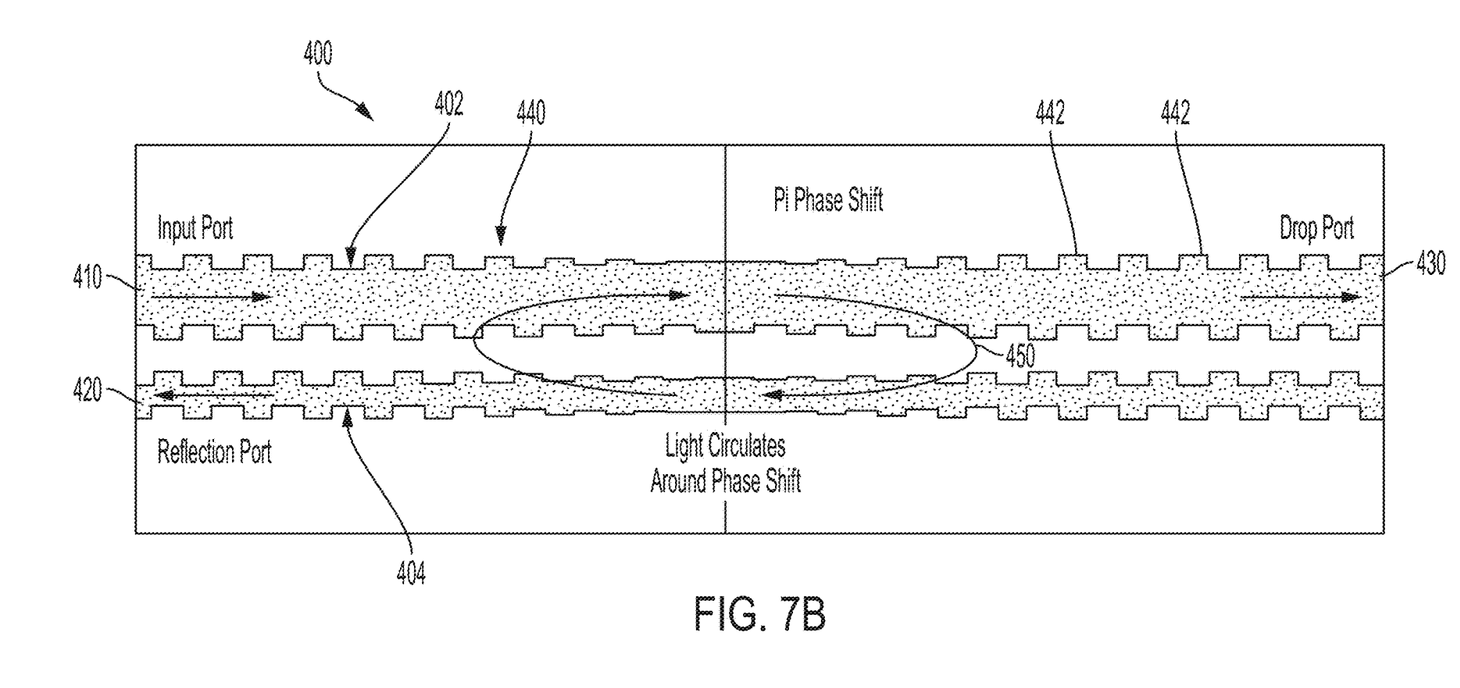
FIG. 7B is an enlarged top view of a portion of the optical notch filter of FIG. 7A.

FIGS. 7A and 7B illustrate the design of an optical notch filter 400, according to an exemplary embodiment, which can be implemented in the optical filter arrays as part of a filter bus for the air data detection systems described previously. The optical notch filter 400 comprises a waveguide structure including a first waveguide 402 and a second waveguide 404. An input port 410 is located at a first end of first waveguide 402, a reflection port 420 is located at a first end of second waveguide 404 adjacent to input port 410, and a drop port 430 is located at an opposite second end of first waveguide 402. A grating-assisted directional coupler 440 is located in a central portion of the waveguide structure between input port 410 and drop port 430. The grating-assisted directional coupler 440 has a periodic grating structure 442 on each of first and second waveguides 402, 404, as shown in FIG. 6B. In one embodiment, optical notch filter 400 can be based on a silicon nitride-based design.

The optical notch filter 400 is configured to receive light injected into input port 410, which directs the light to grating-assisted directional coupler 440. At the center of periodic grating structure 442 (FIG. 7B), a pi phase shift in the phase of the modulation employed to create the grating structure generates a tightly confined light field 450 at the resonance wavelength, with the light circulating around the pi phase shift. A pi phase shift is an abrupt change in the phase of the modulation that defines the grating. If the grating to the left of the shift (x<x_shift) is defined by the function sin(2*pi*x/period), then the grating to the right of the shift (x>x_shift) is defined by the function sin((2*pi*x/period)+pi). In other words, a pi phase shift is an abrupt change in a spatial pattern of the waveguide modulation, such that a periodic structure of the waveguide modulation is shifted in spatial phase by pi radians on either side of an interface.

Figure 7C:
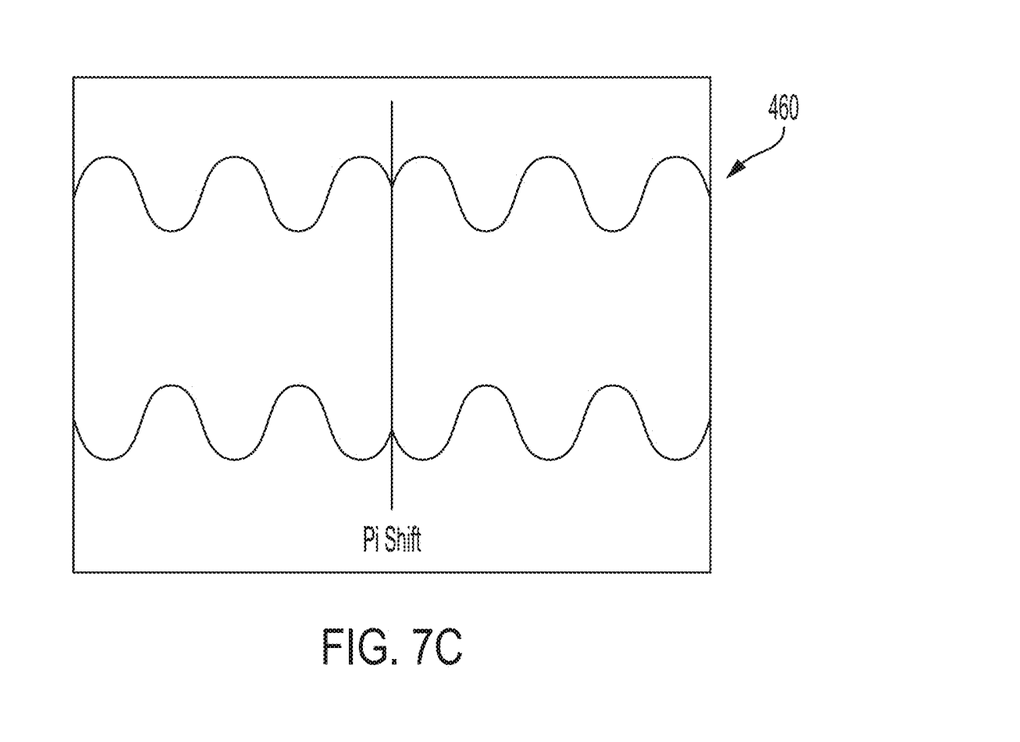
FIG. 7C is an enlarged top view of a pi phase shift design, according to one embodiment, which can be employed in the optical notch filter of FIG. 7A.

One example embodiment of a pi phase shift design 460, which can be employed in notch filter 400, is shown in FIG. 7C. The pi phase shift design 460 allows the selected wavelength of light to be transmitted to drop port 430 (FIG. 7A). All other wavelengths of light exit through reflection port 420 and thus will remain on the filter bus. The resonance wavelength can be modified by changing the period of the grating structure, and the filter bandwidth can be optimized for specific application requirements.

Figure 8:
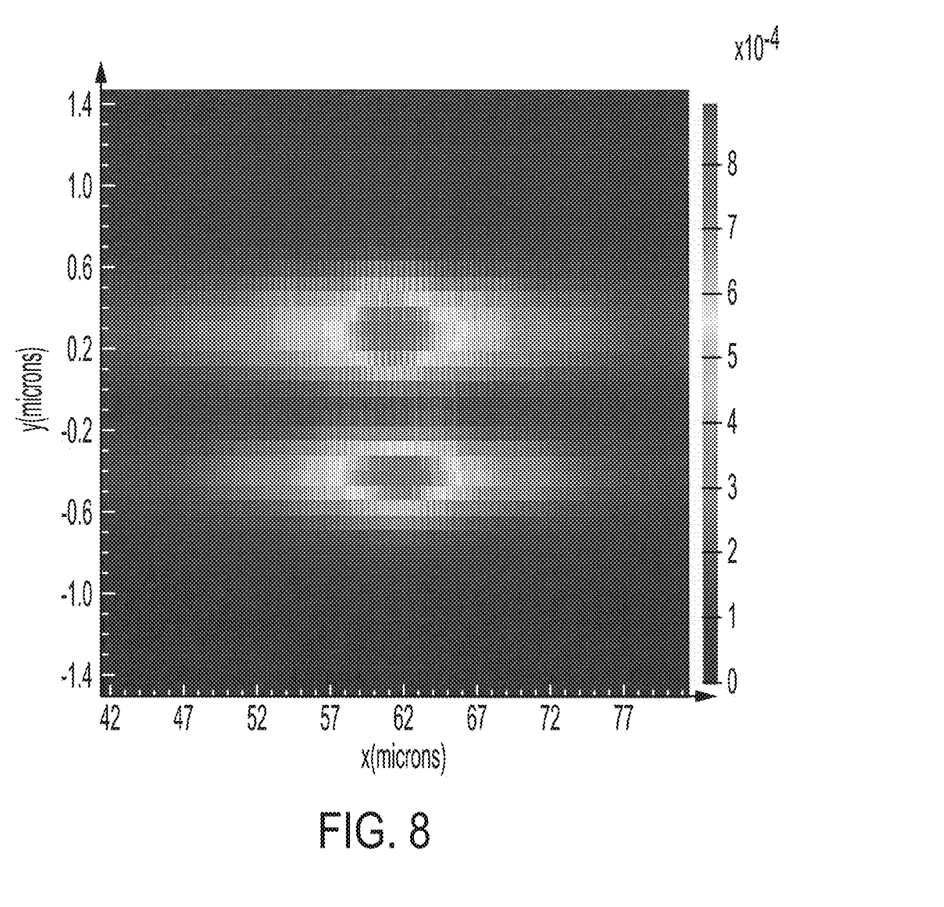
FIG. 8 is a modeled graphical representation of the simulated performance of the optical notch filter of FIG. 7A.

FIG. 8 is a modeled graphical representation of the simulated performance of optical notch filter 400. FIG. 8 shows the electric field that will be generated when light at the resonance frequency is injected into notch filter 400. Under this resonance condition, the light will pass through notch filter 400.

Figure 9:
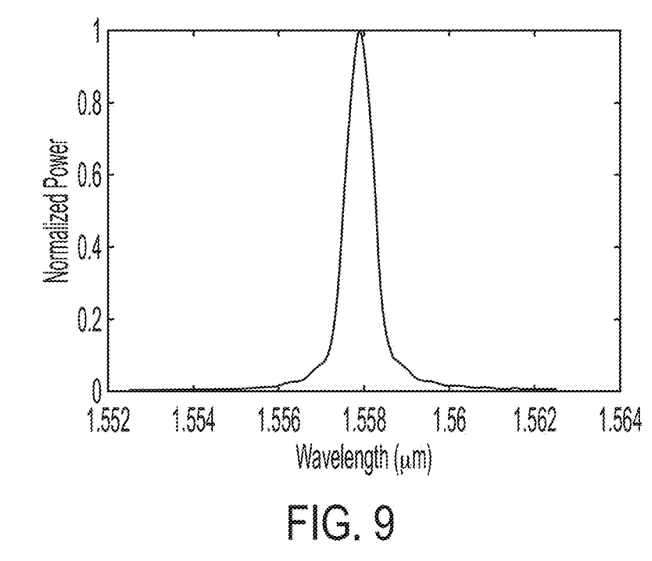
FIG. 9 is a graph of the simulated performance of the optical notch filter of FIG. 7A.

FIG. 9 is a graph of the simulated performance of optical notch filter 400, showing an exemplary transmission spectrum for a simulated resonator of notch filter 400. In particular, FIG. 9 shows the normalized signal power with respect to wavelength for an optical signal that passes through notch filter 400 to a detector. At the desired resonance frequency, the transmission increases to 1, and away from resonance the transmission drops to 0.

Figure 10:
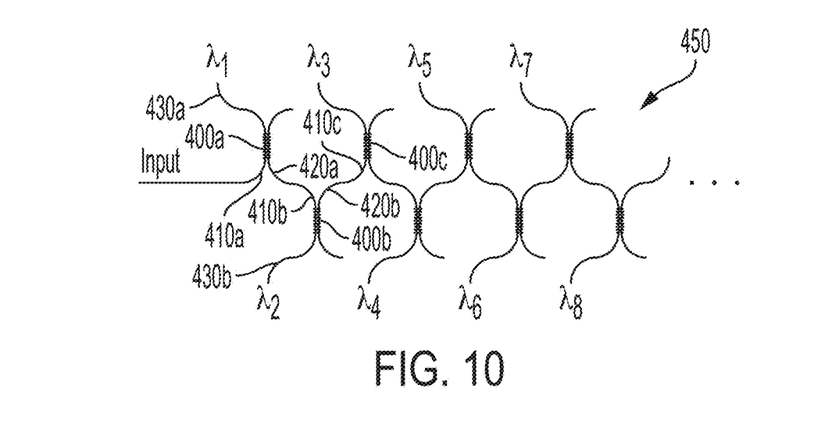
FIG. 10 is a schematic illustration of an array configuration for the optical notch filter of FIG. 7A, according to one implementation.

FIG. 10 illustrates and array configuration 450 for optical notch filter 400, according to one implementation. The array configuration 450 is arranged such that light is directed from an input of the array to an input port 410a of a first notch filter 400a. A first frequency ($\lambda_1$) is passed through a drop port 430a of first notch filter 400a, and the remaining frequencies are reflected through a reflection port 420a of first notch filter 400a to an input port 410b of a second notch filter 400b. A second frequency ($\lambda_2$) is passed through a drop port 430b of second notch filter 400b, and the remaining frequencies are reflected through a reflection port 420b of second notch filter 400b to an input port 410c of a third notch filter 400c. This filtering process continues until all of the notch filters have passed the remaining selected frequencies ($\lambda_3$ to $\lambda_8$).

While FIG. 10 shows eight optical notch filters implemented in array configuration 450, it should be understood that additional notch filters can be added to the array as needed for various applications. For example, in one embodiment, array configuration 450 can be utilized in a passive optical spectrum analyzer.

Figure 11:
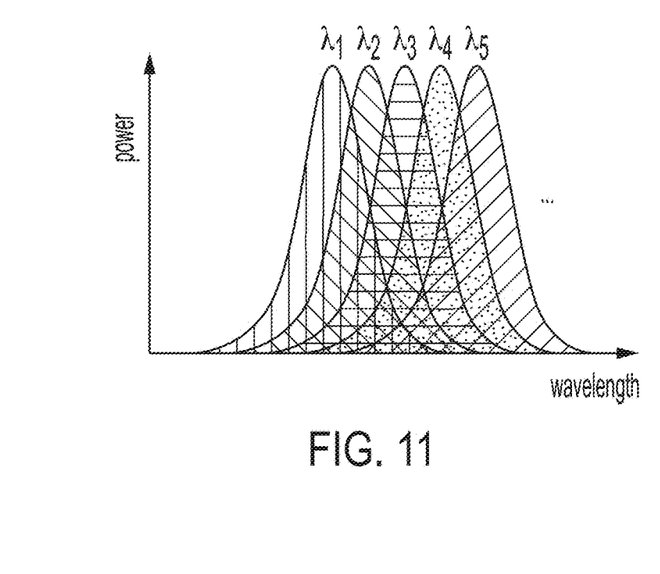
FIG. 11 is a graph of the simulated performance of a filter array of optical notch filters, showing the filter array pass bands.

FIG. 11 is a graph of the simulated performance of a filter array of optical notch filters, showing the filter array pass bands. To maximize photon collection efficiency and accuracy, the filter array is configured such that the pass bands ($\lambda_1$ to $\lambda_5$) overlap with each other, as shown in FIG. 11. The resonance frequencies of the resonators in the filters may be modified by changing the grating period from one resonator to the next.

Figure 12:
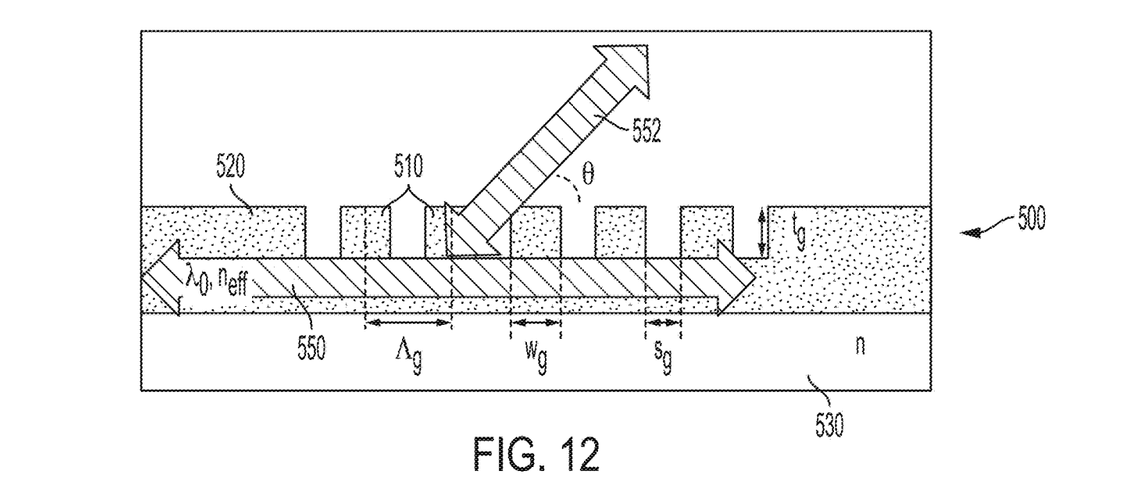
FIG. 12 is a cross-sectional side view of a grating coupler, according to an exemplary embodiment, which can be implemented as part of a LiDAR air data system.

FIG. 12 is a cross-sectional side view of a grating coupler 500, such as an SiP grating coupler, which can be utilized in some of the air data detection systems described previously. The grating coupler 500 includes a periodic grating structure 510, which is formed as part of a waveguide layer 520 that is composed of a higher refractive index material. The periodic grating structure 510 and waveguide layer 520 are embedded in a cladding layer 530, which is composed of a lower refractive index material.

FIG. 12 illustrates the design parameters of grating coupler 500, which is based on the following equation:

$$\frac{2\pi n}{\lambda_0}\sin(\theta) = \frac{2\pi n_{eff}}{\lambda_0} - \frac{2\pi}{\Lambda_g}$$

where n is the refractive index of the cladding material, $\lambda_0$ is the wavelength of the input light, $n_{eff}$ is the effective refractive index of the grating material, $\theta$ is the angle of the diffracted light, and $\Lambda_g$ is the spatial period of the grating structure. As further shown in FIG. 12, $w_g$ is the width of a single periodic grating structure, $s_g$ is the space between adjacent periodic grating structures, and $t_g$ is the thickness of each periodic grating structure.

As shown in FIG. 12, the periodic grating structure 510 is formed to preferentially diffract an input in-plane light beam 550 in a direction of interest at a selected angle as a diffracted light beam 552. For a given wavelength, this diffraction angle can cover nearly the entire 180 degree angular space above a chip where grating coupler 500 is located. As a reciprocal device, the grating coupler can additionally receive specific-wavelength light from a given angle of interest.

Accordingly, in some embodiments, grating coupler 500 can be incorporated into a chip to diffract in-plane light from a waveguide to out-of-plane, or to receive out-of-plane light that is coupled into an in-plane waveguide.

Figure 13:
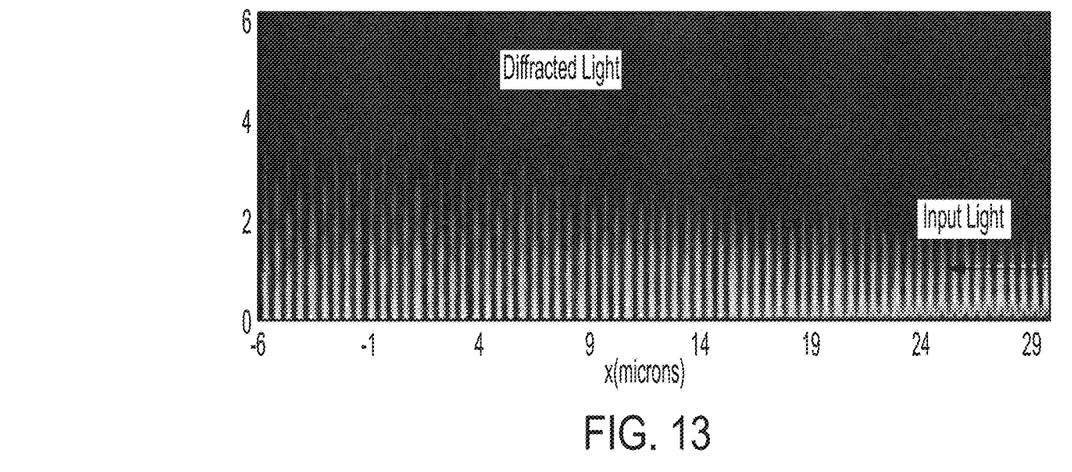
FIG. 13 is a modeled graphical representation of the simulated performance of the grating coupler of FIG. 12.

FIG. 13 is a modeled graphical representation of the simulated performance of grating coupler 500 such as an SiP grating coupler. FIG. 13 shows the input light propagating along the grating as well as the significantly weaker, diffracted light field. The diffracted light field may become stronger relative to the propagating field, reducing required grating size, by increasing the grating coefficient. This may in turn be done by increasing the etch depth of the grating.

Figure 14:
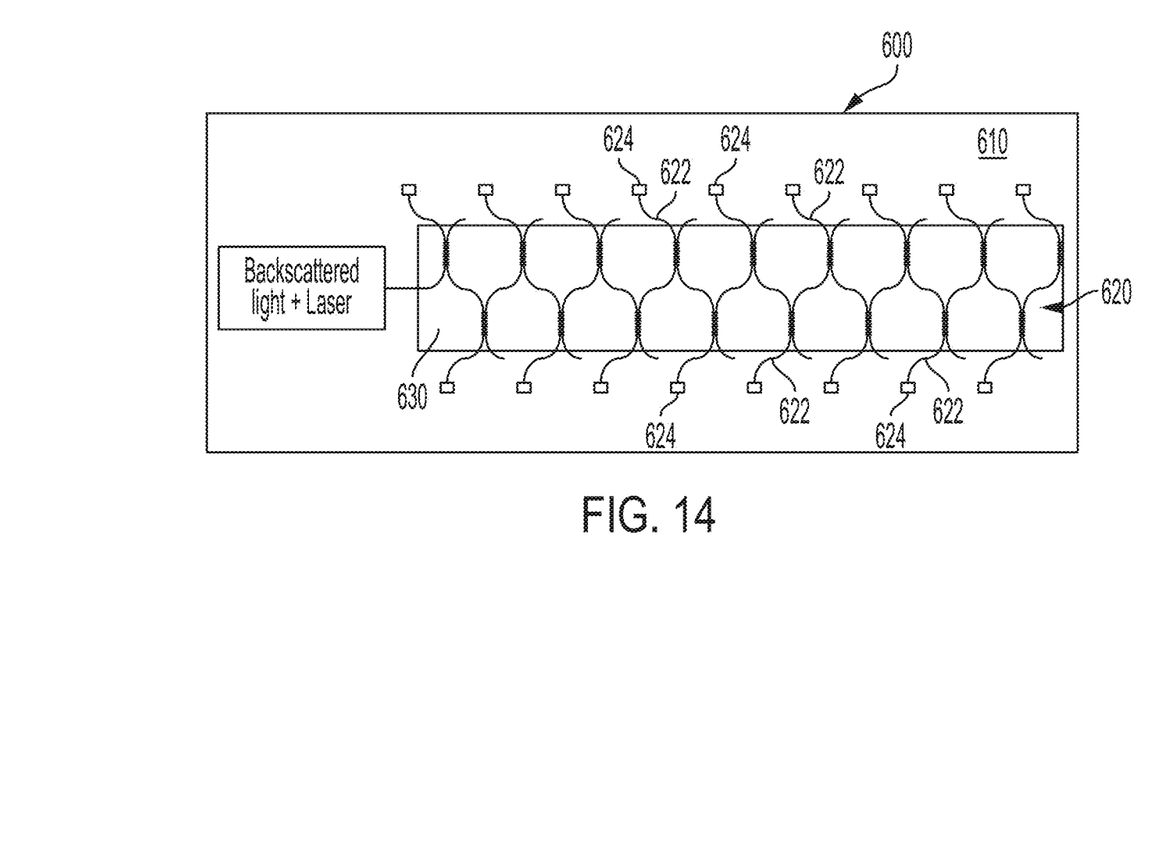
FIG. 14 is a schematic illustration of an air data detection system, according to an alternative embodiment, which can be implemented as part of a LiDAR air data system.

FIG. 14 illustrates an air data detection system 600, according to an alternative embodiment, which can be implemented as part of a LiDAR air data system. The detection system 600 includes a photonics substrate 610 such as a SiP chip. The photonics substrate 610 has a passive optical filter array 620, which includes a plurality of optical notch filters 622 that are in optical communication with each other. A plurality of optical detectors 624 are each respectively coupled to an output of one of optical notch filters 622. The optical notch filters 622 are operative for frequency selection such that each notch filter passes a selected frequency band to a respective one of optical detectors 624.

The photonics substrate 610 is configured to receive backscattered light from a region of interest that is interrogated by a beam from a probing laser, and a portion of the beam from the laser as a reference beam for Doppler shift. The backscattered light and reference beam can be coupled onto photonics substrate 610 through various mechanisms such as described in previous embodiments (e.g., grating coupler and/or optical fibers).

As shown in FIG. 14, a heater 630 is integrated with optical filter array 620 on photonics substrate 610. The heater 630 is configured to align the decomposition band with the frequency of the probing laser. The heater 630 is adjustable to provide for frequency tuning of optical filter array 620, which overcomes the possibility of the probing laser, and thus the backscattered light, drifting in wavelength overtime. The filtering process for optical filter array 620 is similar to that described in previous embodiments, such that all of notch filters 622 pass respective selected frequencies to respective detectors 624.

It should be understood that a heater can also be implemented with the optical filter array in each of the previous embodiments, to provide for frequency tuning of the optical filter array.

Example Embodiments

Example 1 includes a system for light detection and ranging (LiDAR) based sensing including air data detection, the system comprising: a photonics substrate comprising: a passive optical filter array configured to receive: backscattered light produced in a region of interest when a light beam is emitted by a laser device; and a reference beam from the laser device; wherein the passive optical filter array includes: a plurality of optical notch filters in optical communication with each other, the optical notch filters operative for frequency selection; and a plurality of optical detectors each respectively coupled to an output of one of the optical notch filters; wherein the passive optical filter array is operative to perform frequency spectrum decomposition of the received backscattered light into a plurality of signals for data extraction and processing to determine air data parameters.

Example 2 includes the system of Example 1, wherein the photonics substrate comprises a silicon photonics chip.

Example 3 includes the system of any of Examples 1-2, wherein the backscattered light and the reference beam are coupled onto the photonics substrate through one or more optical components comprising an optical fiber, a grating coupler, a waveguide, or combinations thereof.

Example 4 includes the system of any of Examples 1-3, wherein each of the optical notch filters is operative to pass a selected frequency band to a respective one of the optical detectors.

Example 5 includes the system of any of Examples 1-4, wherein the optical notch filters each comprise: a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 6 includes the system of Example 5, wherein the first waveguide is configured to receive light injected into the input port and direct the light to the grating-assisted directional coupler; and the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift; wherein a selected wavelength of the light is transmitted to the drop port, and all other wavelengths of the light exit through the reflection port.

Example 7 includes the system of any of Examples 1-6, wherein the photonics substrate further comprises: a first fiber-to-waveguide coupler configured to couple the backscattered light from a first optical fiber into a first waveguide of the photonics substrate, the first waveguide in optical communication with the passive optical filter array such that the coupled backscattered light is directed to an input of the passive optical filter array; and a second fiber-to-waveguide coupler configured to couple the reference beam from a second optical fiber into a second waveguide of the photonics substrate, the second waveguide in optical communication with the passive optical filter array such that the coupled reference beam is directed to the input of the passive optical filter array.

Example 8 includes the system of any of Examples 1-6, wherein the photonics substrate further comprises: a grating coupler configured to couple the backscattered light into a first waveguide of the photonics substrate, the first waveguide in optical communication with the passive optical filter array such that the coupled backscattered light is directed to an input of the passive optical filter array; and a fiber-to-waveguide coupler configured to couple the reference beam from an optical fiber into a second waveguide of the photonics substrate, the second waveguide in optical communication with the passive optical filter array such that the coupled reference beam is directed to the input of the passive optical filter array.

Example 9 includes the system of Example 8, wherein the grating coupler is a silicon photonics grating coupler.

Example 10 includes the system of any of Examples 1-6, wherein the photonics substrate further comprises: a grating coupler configured to couple the backscattered light and the reference beam into a waveguide of the photonics substrate, the waveguide in optical communication with the passive optical filter array such that the coupled backscattered light and reference beam are directed to an input of the passive optical filter array.

Example 11 includes the system of Example 10, wherein the grating coupler is a silicon photonics grating coupler.

Example 12 includes the system of any of Examples 1-11, wherein the reference beam is coupled into the photonics substrate to provide a reference for Doppler shift.

Example 13 includes the system of any of Examples 1-12, wherein the photonics substrate further comprises a heater coupled to the passive optical filter array.

Example 14 includes the system of Example 13, wherein the heater is adjustable to provide for frequency tuning of the passive optical filter array.

Example 15 includes an air data system, comprising: a laser device operative to emit a light beam into a region of interest, wherein backscattered light resulting from the light beam is produced in the region of interest; an air data detection system in operative communication with the laser device, the air data detection system including a photonics substrate comprising: at least one optical coupler configured to receive the backscattered light from the region of interest, and a reference beam from the laser device; and a passive optical filter array in optical communication with the at least one optical coupler, the optical filter array configured to receive the backscattered light and the reference beam from the at least one optical coupler, wherein the passive optical filter array includes: a plurality of optical notch filters in optical communication with each other, the optical notch filters operative for frequency selection; and a plurality of optical detectors each respectively coupled to an output of one of the optical notch filters; and a processing unit operatively coupled to an output of the passive optical filter array; wherein the passive optical filter array is operative to perform frequency spectrum decomposition of the received backscattered light into a plurality of signals used for data extraction by the processing unit to determine air data parameters.

Example 16 includes the system of Example 15, wherein each of the optical notch filters is operative to pass a selected frequency band to a respective one of the optical detectors.

Example 17 includes the system of any of Examples 15-16, wherein the optical notch filters each comprise: a waveguide structure including a first waveguide and a second waveguide, the waveguide structure comprising: an input port located at a first end of the first waveguide; a reflection port located at a first end of the second waveguide and adjacent to the input port; a drop port located at an opposite second end of the first waveguide; and a grating-assisted directional coupler located in a central portion of the waveguide structure between the input port and the drop port, the grating-assisted directional coupler including a periodic grating structure on each of the first and second waveguides.

Example 18 includes the system of Example 17, wherein the first waveguide is configured to receive light injected into the input port and direct the light to the grating-assisted directional coupler; and the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift; wherein a selected wavelength of the light is transmitted to the drop port, and all other wavelengths of the light exit through the reflection port.

Example 19 includes the system of any of Examples 15-18, wherein the reference beam is coupled into the photonics substrate to provide a reference for Doppler shift.

Example 20 includes the system of any of Examples 15-19, wherein the photonics substrate further comprises a heater coupled to the passive optical filter array.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for light detection and ranging (LiDAR) based sensing including air data detection, the system comprising:
    a photonics substrate comprising:
        a passive optical filter array configured to receive:
            backscattered light produced in a region of interest when a light beam is emitted by a laser device; and
            a reference beam from the laser device;
        wherein the passive optical filter array includes:
            a plurality of optical notch filters in optical communication with each other, the optical notch filters operative for frequency selection; and
            a plurality of optical detectors each respectively coupled to an output of one of the optical notch filters;
        wherein the passive optical filter array is operative to perform frequency spectrum decomposition of the received backscattered light into a plurality of signals for data extraction and processing to determine air data parameters.

2. The system of claim 1, wherein the photonics substrate comprises a silicon photonics chip.

3. The system of claim 1, wherein the backscattered light and the reference beam are coupled onto the photonics substrate through one or more optical components comprising an optical fiber, a grating coupler, a waveguide, or combinations thereof.

4. The system of claim 1, wherein each of the optical notch filters is operative to pass a selected frequency band to a respective one of the optical detectors.

5. The system of claim 1, wherein the optical notch filters each comprise:
    a waveguide structure including a first waveguide and a second waveguide, the waveguide structure comprising:
        an input port located at a first end of the first waveguide;
        a reflection port located at a first end of the second waveguide and adjacent to the input port;
        a drop port located at an opposite second end of the first waveguide; and
        a grating-assisted directional coupler located in a central portion of the waveguide structure between the input port and the drop port, the grating-assisted directional coupler including a periodic grating structure on each of the first and second waveguides.

6. The system of claim 5, wherein:
    the first waveguide is configured to receive light injected into the input port and direct the light to the grating-assisted directional coupler; and
    the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;
    wherein a selected wavelength of the light is transmitted to the drop port, and all other wavelengths of the light exit through the reflection port.

7. The system of claim 1, wherein the photonics substrate further comprises:
    a first fiber-to-waveguide coupler configured to couple the backscattered light from a first optical fiber into a first waveguide of the photonics substrate, the first waveguide in optical communication with the passive optical filter array such that the coupled backscattered light is directed to an input of the passive optical filter array; and
    a second fiber-to-waveguide coupler configured to couple the reference beam from a second optical fiber into a second waveguide of the photonics substrate, the second waveguide in optical communication with the passive optical filter array such that the coupled reference beam is directed to the input of the passive optical filter array.

8. The system of claim 1, wherein the photonics substrate further comprises:
    a grating coupler configured to couple the backscattered light into a first waveguide of the photonics substrate, the first waveguide in optical communication with the passive optical filter array such that the coupled backscattered light is directed to an input of the passive optical filter array; and
    a fiber-to-waveguide coupler configured to couple the reference beam from an optical fiber into a second waveguide of the photonics substrate, the second waveguide in optical communication with the passive optical filter array such that the coupled reference beam is directed to the input of the passive optical filter array.

9. The system of claim 8, wherein the grating coupler is a silicon photonics grating coupler.

10. The system of claim 1, wherein the photonics substrate further comprises:
    a grating coupler configured to couple the backscattered light and the reference beam into a waveguide of the photonics substrate, the waveguide in optical communication with the passive optical filter array such that the coupled backscattered light and reference beam are directed to an input of the passive optical filter array.

11. The system of claim 10, wherein the grating coupler is a silicon photonics grating coupler.

12. The system of claim 1, wherein the reference beam is coupled into the photonics substrate to provide a reference for Doppler shift.

13. The system of claim 1, wherein the photonics substrate further comprises a heater coupled to the passive optical filter array.

14. The system of claim 1, wherein the heater is adjustable to provide for frequency tuning of the passive optical filter array.

15. An air data system, comprising:
a laser device operative to emit a light beam into a region of interest, wherein backscattered light resulting from the light beam is produced in the region of interest;
an air data detection system in operative communication with the laser device, the air data detection system including a photonics substrate comprising:
at least one optical coupler configured to receive the backscattered light from the region of interest, and a reference beam from the laser device; and
a passive optical filter array in optical communication with the at least one optical coupler, the optical filter array configured to receive the backscattered light and the reference beam from the at least one optical coupler, wherein the passive optical filter array includes:
a plurality of optical notch filters in optical communication with each other, the optical notch filters operative for frequency selection; and
a plurality of optical detectors each respectively coupled to an output of one of the optical notch filters; and
a processing unit operatively coupled to an output of the passive optical filter array;
wherein the passive optical filter array is operative to perform frequency spectrum decomposition of the received backscattered light into a plurality of signals used for data extraction by the processing unit to determine air data parameters.

16. The system of claim 15, wherein each of the optical notch filters is operative to pass a selected frequency band to a respective one of the optical detectors.

17. The system of claim 15, wherein the optical notch filters each comprise:
a waveguide structure including a first waveguide and a second waveguide, the waveguide structure comprising:
an input port located at a first end of the first waveguide;
a reflection port located at a first end of the second waveguide and adjacent to the input port;
a drop port located at an opposite second end of the first waveguide; and
a grating-assisted directional coupler located in a central portion of the waveguide structure between the input port and the drop port, the grating-assisted directional coupler including a periodic grating structure on each of the first and second waveguides.

18. The system of claim 17, wherein:
the first waveguide is configured to receive light injected into the input port and direct the light to the grating-assisted directional coupler; and
the periodic grating structure of the grating-assisted directional coupler is configured to produce a pi phase shift, which is an abrupt change in a spatial pattern of waveguide modulation, such that a periodic structure of the waveguide modulation is shifted in spatial phase by pi radians on either side of an interface, that generates a confined field of the light at a resonance wavelength, with the light circulating around the pi phase shift;
wherein a selected wavelength of the light is transmitted to the drop port, and all other wavelengths of the light exit through the reflection port.

19. The system of claim 15, wherein the reference beam is coupled into the photonics substrate to provide a reference for Doppler shift.

20. The system of claim 15, wherein the photonics substrate further comprises a heater coupled to the passive optical filter array.

* * * * *